Oct. 31, 1961  T. USHER, JR  3,007,095
VIBRATION EXCITER AMPLITUDE PROTECTOR SENSING CIRCUIT
Filed Dec. 30, 1958  2 Sheets-Sheet 1

INVENTOR
THERON USHER, JR.
BY
*Byerly, Townsend, Watson & Churchill*
ATTORNEYS

United States Patent Office 3,007,095
Patented Oct. 31, 1961

3,007,095
VIBRATION EXCITER AMPLITUDE PROTECTOR SENSING CIRCUIT
Theron Usher, Jr., North Guilford, Conn., assignor, by mesne assignments, to Textron Electronics, Inc., a corporation of Delaware
Filed Dec. 30, 1958, Ser. No. 783,768
8 Claims. (Cl. 318—132)

The present invention relates to vibration exciter systems and more particularly to protective circuitry for preventing damage to an exciter due to faulty excitation.

A basic system for vibration testing includes an electrodynamic vibration exciter, a power amplifier for supplying exciting voltage to the driving coil of the exciter, and a source of test signals which are fed to the power amplifier. Various safety devices may be provided for operation between or in conjunction with each of the system components. However, as an additional safety feature, it is desirable to include some means responsive to the energizing voltage actually supplied to the driving coil for interrupting this voltage and stopping the exciter if the voltage should assume dangerous proportions.

The apparatus for arresting the motion of the exciter when a fault is detected forms the basis of another application, Serial No. 783,774, filed contemporaneously herewith in the name of Gabriel Hajian and assigned to the same assignee as the present application and will not be discussed here beyond that necessary to an understanding of the present invention which is directed to means for sensing the damaging propensities of the voltage applied to the driving coil.

More specifically, when signals applied to the driving coil of the exciter by an electronic power amplifier become excessive, or if a fault occurs in the amplifier, damage to the moving element of the exciter is likely if the moving element is allowed to strike the mechanical stops. Because of kinetic energy, efficient operation requires dynamic braking of the exciter moving element in addition to disabling of the power amplifier and power supplies. In the aforesaid copending application there is described an arrangement consisting of gaseous discharge devices for providing an effective short-circuit across the driving coil of the exciter as well as a short-circuit across the power supply for the power amplifier when a fault is detected. It can be appreciated that with such dynamic braking and disabling circuitry it is important that the fault sensing means have extreme reliability and the ability to discern accurately between maximum safe signals and those which are dangerous. It is equally important that the means for sensing dangerous signal conditions work equally well under all conditions of signal amplitude supplied to and load attached to the exciter.

Therefore, in accordance with the present invention there is provided a fault sensing circuit for a vibration exciter system comprising an electrical network having an input for coupling in parallel with the driving coil of the exciter, an output, and a frequency response characteristic closely conforming at least at low frequencies to the displacement/input voltage response with respect to frequency of the exciter; and an adjustable amplitude discriminator having an input coupled to the output of the electrical network, and an output for coupling to means for arresting movement of the exciter armature.

The invention will be better understood after reading the following detailed description of one exemplary embodiment thereof with reference to the accompanying drawing in which.

Figure 1:
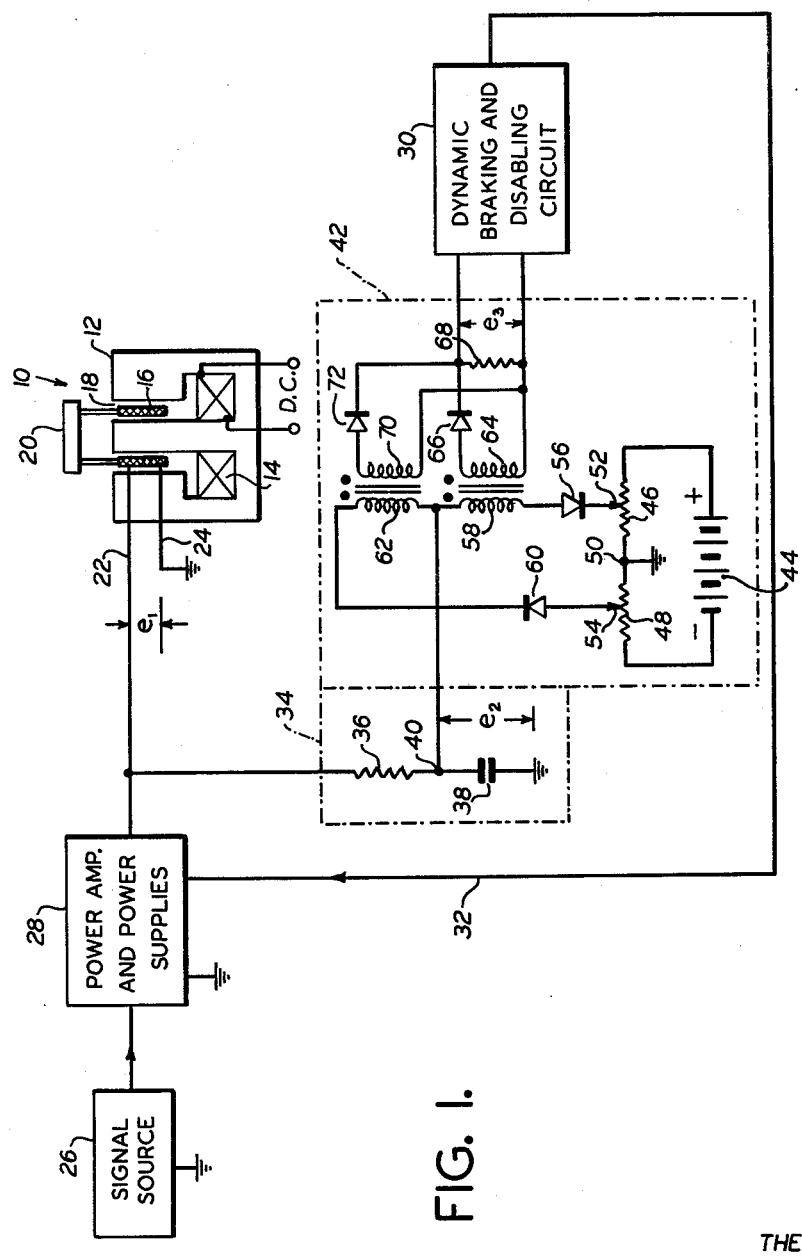
FIGURE 1 represents a schematic circuit diagram of a fault sensing circuit embodying the present invention and applied to a vibration exciter system.

Referring to FIGURE 1 of the drawing, the vibration exciter is designated generally by the reference numeral 10. The exciter includes a field structure or stator core 12 carrying a field winding 14 which is arranged to be connected to a source of direct current. A driving coil 16 is mounted for movement within the gap 18 provided in the core 12 and carries or is joined to the exciter table 20 for actuation thereof. Input leads 22 and 24 are provided for supplying excitation signals to the driving coil.

A signal source represented generally by the box 26 may include sinusoidal and random noise generators, amplifiers, protective circuits, equalizers, and the like in known manner. The output of the signal source is fed to a power amplifier which, along with the power supplies, is represented by the box 28. The output of the power amplifier is connected as shown to the input 22, 24 of the driving coil of the exciter. The structure described to this point represents a basic electronic exciter system.

A dynamic braking and disabling circuit is represented by the box 30. This circuit may take the form described and claimed in the aforementioned application or may consist of any equivalent fast acting means for rapidly arresting the movement of the armature of the vibration exciter 10 upon receipt of a triggering signal. For the purpose of illustration, the braking and disabling circuit is shown as a separate device whose output is connected over connection 32 to the power amplifier and power supplies 28. However, it is to be understood that the circuits in box 30 may, in reality, be integrated into the power amplifier circuit and so forth.

The fault sensing circuit according to the present invention is shown as comprising an electrical network within the dot-dash box 34 having an input coupled in parallel with the driving coil 16 of the exciter. That is, the integrating network 34 consisting of a resistor 36 in series with a capacitor 38 is connected across the driving coil. The free end of resistor 36 is connected to the input lead 22 of the driving coil 16 while the end of capacitor 38 remote from its junction 40 with resistor 36 is connected through ground to the other input lead 24 of the driving coil. The output of the network 34 is taken between the junction 40 and ground and is connected to an adjustable amplitude discriminator shown within the dot-dash box 42.

A source of direct current biasing voltage represented by the battery 44 is connected across two potentiometers 46 and 48 in series. The junction 50 between the potentiometers is connected to ground as a point of reference potential. With the battery polarized as shown the potential at the sliders 52 and 54 will be, respectively, positive and negative with respect to ground. The slider 52 is connected to the cathode of a unilateral conducting device or rectifier 56. The anode of the rectifier 56 is connected through the primary winding 58 of a pulse transformer to the output point 40 of the network 34. In similar manner the slider 54 is connected to the anode of a unilateral conducting device or rectifier 60. The cathode of the rectifier 60 is connected through the primary winding 62 of a second pulse transformer to the output 40 of the network 34.

Coupled with winding 58 is a secondary winding 64 which is connected in series with a rectifier 66 across a load resistor 68. Another secondary winding 70 is coupled with primary winding 62 and connected in series with a rectifier 72 across the load resistor 68 in parallel with the output from winding 64. The rectifiers 66 and 72 are so polarized that only signals of the same polarity can be supplied to the resistor 68 from the windings 64 and 70. At the same time the rectifiers isolate the secondary windings 64 and 70 one from the other.

Finally, the output developed across resistor 68 is coupled to the dynamic braking and disabling circuit 30.

The operation of the circuit is as follows. The biasing potentials appearing at the sliders 52 and 54 are adjusted to a critical limiting value related to the characteristics of the vibration exciter 10. Normally these voltages will be of equal magnitude although of opposite polarity, as shown. It will be evident that the rectifiers 56 and 60 are polarized so as to be non-conducting until the potential at the point 40 exceeds the potential at either or both sliders. When this occurs, a sudden flow of current passes through the corresponding pulse transformer primary winding inducing a voltage with the indicated polarity in the associated secondary winding. This, in turn, develops a pulse of voltage across the resistor 68. Due to the rectifiers 66 and 72, the voltage across resistor 68, i.e., voltage $e_3$, will always be of the same polarity regardless of which pulse transformer is energized. Thus, if the potential at point 40 goes excessively positive with respect to ground, current will flow through winding 58 and rectifier 56. This will induce a voltage in winding 64 resulting in a pulse across resistor 68. In similar fashion, if the potential at point 40 goes excessively negative, windings 62 and 70 will be energized. In either case a triggering signal will be supplied to the dynamic braking and disabling circuit.

Figure 2:
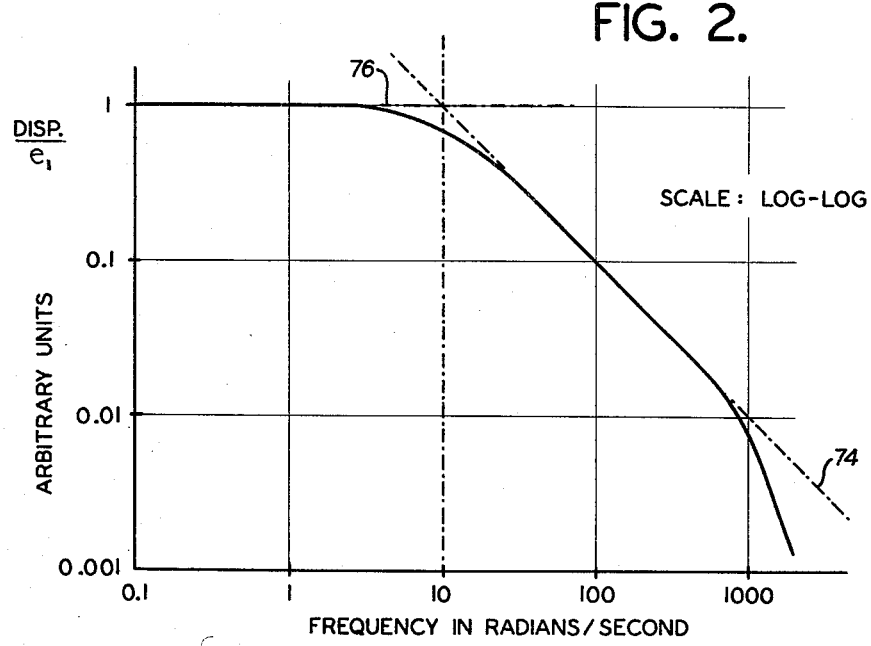
FIGURE 2 is a graph plotted to logarithmic scales of the displacement/input voltage response with respect to frequency of an exciter at low frequencies.

Referring to FIGURE 2, there is shown in solid line a log-log plot of the displacement/voltage input response with respect to frequency of a typical vibration exciter for excitation from 0.1 to 1000 radians per second. It will be observed that the response is generally flat up to about 10 radians/sec. and then falls off almost linearly at a slope of approximately −1 up to a frequency of about 1000 radians/sec. Beyond 1000 radians/sec. the response drops off at a more rapid rate. If the tangent to the curve between 10 and 1000 radians/sec. is drawn as shown by the dashed line 74, and the horizontal asymptote represented by the dashed line 76 is added, the two lines will intersect at a particular frequency. In the example they intersect at 10 radians/sec. This is variously referred to as the corner or break frequency.

Figure 3:
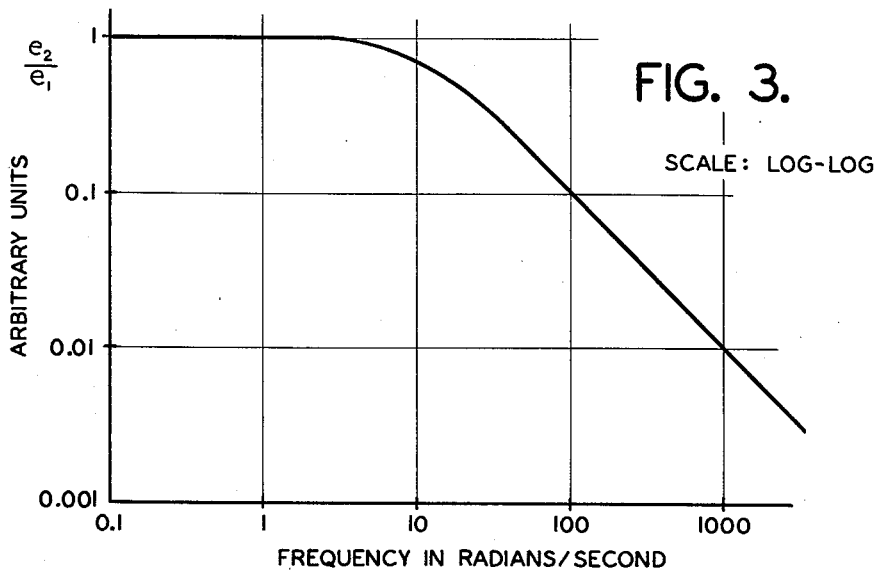
FIGURE 3 is a graph plotted to logarithmic scales of the frequency response characteristic of an electrical network forming a part of the circuit of FIGURE 1.

In FIGURE 3 there is shown a response curve, also in the form of a log-log plot, of a typical resistance-capacitance integrating network of the type described in connection with FIGURE 1. The voltage $e_2$ and $e_1$ in FIGURE 3 correspond to the same voltages indicated in FIGURE 1. By choosing the time constant of the resistance-capacitance network equal to the period of the corner or break frequency, i.e. equal to 0.1, the frequency response of the network can be made generally flat up to about 10 radians/sec. and then caused to fall off substantially linearly at a slope of −1 through the frequency of 1000 radians/sec. It should be evident that this response can be made to conform very closely to the displacement/voltage input response with respect to frequency of the exciter.

Suppose a fault in the energizing circuit (e.g., circuits 26 and 28) causes a pulse of high voltage to be applied to the coil 16 of the exciter. The moving element will accelerate and move toward one of the mechanical stops. When the voltage across the capacitor 38 builds up to the critical value, the dynamic braking and disabling circuit 30 is actuated. However, the armature or moving structure of the exciter has moved some distance already, and since it has kinetic energy, it must travel an additional distance before this energy is dissipated by the braking process. The critical value of voltage must be chosen, therefore, so that the total displacement, including the travel after the fault is detected, does not exceed the distance from the starting point to the mechanical stops.

The critical voltage for a given total displacement is not dependent upon the amplitude of the voltage $e_1$ or upon the magnitude of the load weight attached to the table 20. If the load mass is increased, for example, the armature will travel less distance before the circuit 30 is actuated, but will require more over-travel distance due to the heavier mass. However, the total of the two remains the same as before. If the fault voltage $e_1$ increases, the voltage $e_2$ across capacitor 38 will reach the critical value sooner so that the circuit 30 will be actuated sooner. This action offsets the effect of the increased acceleration of the exciter moving structure and causes the total displacement to remain constant.

The operation of the circuit may be considered in a different fashion. For sinusoidal signals the velocity of the driving coil 16 is roughly proportional to the exciting voltage $e_1$. Since the network 34 functions as an integrating network in the low frequency range, it can be shown that the voltage $e_2$ is proportional to the displacement of the coil 16. Therefore, with $e_2$ proportional to displacement it can be compared with a reference voltage corresponding to maximum safe displacement. It has been found in practice, furthermore, that the fault sensing circuit works substantially as well with non-sinusoidal signals.

Having described the present invention with reference to a typical preferred embodiment thereof it is to be understood that numerous changes can be made therein without departing from the true spirit of the invention involved.

What is claimed is:

1. A fault sensing circuit for a vibration exciter system, where the system is provided with means for arresting movement of the exciter armature, comprising an electrical network having an input for coupling in parallel with the driving coil of the exciter to receive the coil exciting signals independent of coil motion, an output, and a frequency response output characteristic closely conforming at least at low frequencies to the displacement/input voltage response with respect to frequency of the exciter; and an adjustable voltage amplitude discriminator having an input coupled to said output of the electrical network, and an output for coupling to said means for arresting movement of the exciter armature.

2. A fault sensing circuit for a vibration exciter system, where the system is provided with means for arresting movement of the exciter armature, comprising an electrical integrating network effective at least for low frequencies having an input for coupling in parallel with the driving coil of the exciter to receive the coil exciting signals independent of coil motion, and an output; and an adjustable voltage amplitude discriminator having an input coupled to said output of the integrating network, and an output for coupling to said means for arresting movement of the exciter armature.

3. A fault sensing circuit according to claim 2, wherein said integrating network comprises a resistor and capacitor connected in series across the network input, and the network output is connected across said capacitor.

4. A fault sensing circuit according to claim 2, wherein said amplitude discriminator comprises a rectifier and a source of biasing voltage for passing a signal only when the input thereto exceeds said biasing voltage.

5. A fault sensing circuit according to claim 2, wherein said amplitude discriminator comprises a unilateral conducting device, a source of biasing voltage, and a pulse transformer having a primary and a secondary winding, said primary winding being connected in series with said unilateral device and said source of biasing voltage across the discriminator input, and said secondary winding being coupled across the discriminator output.

6. A fault sensing circuit according to claim 2, wherein said amplitude discriminator comprises a first rectifier having an anode and a cathode, a first source of biasing voltage having a negative terminal connected to said anode and a positive terminal connected to one side of the discriminator input, a first pulse transformer having a primary and a secondary winding, said primary winding being connected between the other side of the discriminator input and said cathode, the secondary winding being coupled across the discriminator output, a second rectifier having an anode and a cathode, a second source of biasing voltage having a positive terminal connected to the cathode of said second rectifier and a negative terminal connected to said one side of the discriminator input, a second pulse transformer having a primary and a secondary winding, the primary winding of said second transformer being connected between said other side of the discriminator input and the anode of said second rectifier, the secondary winding of said second pulse transformer being coupled across the discriminator output, and means for isolating the secondary windings of said first and second pulse transformers one from the other.

7. A fault sensing circuit for a vibration exciter system, where the system is provided with means for arresting movement of the exciter armature, comprising a resistor and capacitor in series for connection in parallel with the driving coil of the exciter, a first rectifier having an anode and a cathode, a first source of adjustable biasing voltage having a negative terminal connected to said anode and a positive terminal connected to the end of said capacitor remote from said resistor, a first pulse transformer having a primary and a secondary winding, said primary winding being connected between the resistor-capacitor junction and said cathode, the secondary winding being arranged for coupling to said means for arresting movement of the exciter armature, a second rectifier having an anode and a cathode, a second source of adjustable biasing voltage having a positive terminal connected to the cathode of said second rectifier and a negative terminal connected to said end of the capacitor remote from said resistor, a second pulse transformer having a primary and a secondary winding, the primary winding of said second transformer being connected between said resistor-capacitor junction and the anode of said second rectifier, the secondary winding of said second pulse transformer being coupled in parallel with the secondary winding of said first transformer, and means for isolating said secondary windings one from the other.

8. A vibration exciter system comprising an electronic power amplifier with an output coupled to a driving coil of a vibration exciter; an electrical network having an input coupled to said amplifier output in parallel with said driving coil, an output, and a frequency response output characteristic closely conforming at least at low frequencies to the displacement/input voltage response with respect to frequency of the exciter; an adjustable voltage amplitude discriminator having an input coupled to said output of the electrical network, and an output; and means for arresting movement of the exciter armature, responsively coupled to the output of said discriminator.

References Cited in the file of this patent

UNITED STATES PATENTS

| | | |
|---|---|---|
| 2,297,084 | Swallow | Sept. 29, 1942 |
| 2,322,217 | Baird | June 22, 1943 |
| 2,935,671 | Ross | May 3, 1960 |